UNITED STATES PATENT OFFICE.

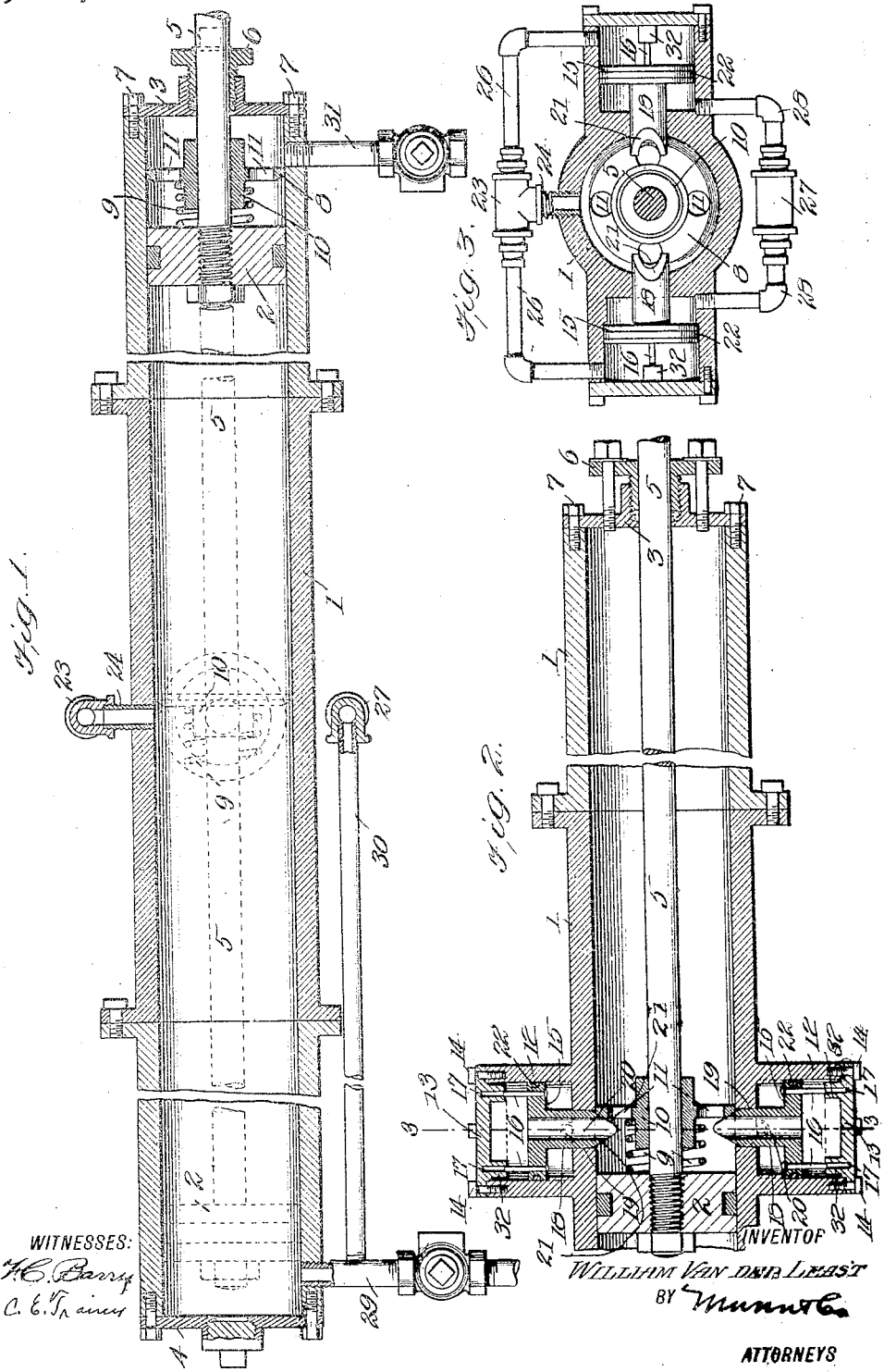

WILLIAM VAN DER LEAST, OF LAONA, WISCONSIN.

AUTOMATIC STEAM-FEED AND PISTON-ROD SUPPORT.

1,042,849.   Specification of Letters Patent.   Patented Oct. 29, 1912.

Application filed March 1, 1911. Serial No. 611,624.

*To all whom it may concern:*

Be it known that I, WILLIAM VAN DER LEAST, a citizen of the United States, and a resident of Laona, county of Forest, and State of Wisconsin, have invented certain new and useful Improvements in Automatic Steam-Feed and Piston-Rod Supports, of which the following is a specification.

My invention is an improvement in automatic steam feed and piston rod support, and consists in certain novel constructions and combinations of parts, hereinafter described and claimed.

The object of the invention is to provide a device of the character specified for use in the steam feed cylinder, for supporting the piston rod to prevent sagging and consequent wear on the packings and loss of power.

Referring to the drawings forming a part hereof, Figure 1 is a longitudinal section of a cylinder provided with the improvement. Fig. 2 is a section of the cylinder at right angles to Fig. 1, and, Fig. 3 is a section on the line 3—3 of Fig. 2.

The device is used in saw mills wherein the log carriage is connected with the piston rod of the steam feed cylinder for supporting the said rod. The cylinder 1 is of suitable length, and cross section, and the piston 2 is slidable in the cylinder.

The ends of the cylinder are closed by heads 3 and 4, and the head 3 is provided with an opening for the rod 5, and the rod is encircled by a packing nut 6. The heads are held in place by cap screws 7. A collar 8 encircles the rod 5 within the cylinder, and a spring 9 encircles the hub 10 of the collar. The collar is provided with a plurality of openings 11 to permit the passage of fluid, to equalize the pressure on both sides thereof, and the periphery of the collar fits smoothly the inner surface of the cylinder, while the piston rod fits the bore of the hub of the collar. The collar acts thus to support the rod, and the spring spaces the collar from the piston. The means for holding the ring is preferably arranged at the central portion of the main cylinder, and is composed in part of nipples 12 extending in opposite directions from the said-named cylinder.

Each nipple is closed at its outer end by a cap 13, secured in place by cap screws 14, and a disk or head 15 is slidable in each nipple. Each of the heads is guided by a plurality of pins 16, extending outwardly from the head, and moving in openings 17 in the cap and in stops or lugs 32 on the head 13. Each head is also provided with an inwardly extending hub 18, the said hub traversing an opening 19 in the wall of the main cylinder, and extending into the interior thereof. The hubs are hollow as shown at 20, and the opening 20 extends through the disk or head, to admit fluid behind the head, to equalize the pressure on the same. The inner end of each hub is beveled in opposite directions as shown at 21, and the said ends are adapted to be engaged by the collar 8 before mentioned. The main piston 2, and the heads 15 are provided with the usual fluid-tight packing rings 22.

A T 23 is arranged at one side of the cylinder near the nipples 12, and the lateral branch of the T is connected with the interior of the cylinder by a pipe 24. A branch 26 leads from each end of the T, and opens into the outer end of the adjacent nipple. A similar T 27 is arranged at the opposite side of the cylinder, and the lateral branch of the T is connected to the inlet pipe 29 of the main cylinder by a pipe 30. The ends of the T 27 are connected with the inner ends of the nipples by pipes 28. The cylinder is also provided with a steam pipe 31, at the opposite end from the pipe 29, and the outward movement of the heads 15 is limited by the stops or lugs 32, before mentioned. The guide rods 16 in addition to guiding the heads prevents their rotation, and holds the hubs with their beveled edges in the position shown in Fig. 2.

The hub 10 of the collar extends toward the piston, and the spring and hub space the ring from the piston, so that after the piston passes the hubs 18 of the heads, they are forced inwardly to cause the hubs 18 to engage and hold the collar. The collar is thus retained at the center of the cylinder on the inward stroke of the piston, and supports the rod at approximately its center. On the outward stroke of the piston, the piston engages the collar, after the said piston passes the hubs 18, and carries the collar to the position indicated in Fig. 1. The motive fluid passes behind the heads or to their outer faces, through the bore 20 of the heads, and through the pipes 24 and 26. The heads are normally held in inward position, but may move outwardly to permit the passage of the piston.

The cylinders in actual length are from 30 to 60 feet long, depending upon the extent of movement desired for the carriage. The outer end of the piston 5 is connected with the carriage, and the cylinder in practice is composed of a plurality of connected sections. The motive fluid (generally steam) is admitted to the ends of the cylinder in alternation, in order to cause the piston to reciprocate in the cylinder. It will be evident that when the piston is at the inner end of the cylinder, that is, with the entire length of the rod withdrawn into the cylinder, the said rod, if unsupported intermediate the ends of the cylinder, would tend to bend or buckle. To prevent the said bending or buckling, the collar 8 is provided.

When the parts are in the position shown in Fig. 1, the steam or other motive fluid enters through the pipe 31, and forces the piston toward the opposite end of the cylinder, that is, toward the head 4. When the piston passes the openings of the pipe 24, and the openings 20 through the hubs 18, the steam or other motive fluid is permitted access to the outer ends of the nipples 12, the said motive fluid passing through the openings 20 of the nipples, and through the pipe 24 and pipes 26. Since the aggregate area of the outer surface of the heads 15 is greater than the aggregate area of the inner surface of the said heads, the said heads will be moved inwardly by the motive fluid, and the beveled ends of the hubs 18 will enter between the collar 8 and the piston, as clearly shown in Fig. 2, thus stopping and holding the collar at the center of the cylinder.

The arrangement of the hubs 18 on the inner faces of the heads 15 reduces the areas of the said heads acted upon by the motive fluid. When the collar is so engaged by the beveled ends of the hubs, and held at the center of the cylinder, the piston continues its movement toward the head 4 and the collar 8 offers a support for the central portion of the piston rod. The said rod slides through the hub of the collar. To move the piston in the opposite direction, the steam or other motive fluid is admitted through the pipe 29, while the pipe 31 is connected with the exhaust. The steam or other motive fluid now acts upon the surface of the piston adjacent to the head 4, and tends to move the said piston in the opposite direction, or toward the head 3.

When the steam or other motive fluid is admitted through the pipe 29 to the end of the cylinder adjacent to the head 4, the said steam or other motive fluid is also admitted through the pipe 30, and the pipes 28, to the inner ends of the nipples 12. The outer ends of the said nipples are in communication with the atmosphere, through the pipes 26, the pipe 24, and the pipe 31. Hence there is no pressure other than atmospheric on the outer surface of the said heads and the said heads are forced outwardly by the motive fluid acting on the inner faces thereof. As the heads move outwardly, the hubs 18 are withdrawn out of the path of the piston. When the piston engages the end of the hub of the collar, or rather when the said piston engages the spring 9, the collar is moved in front of the piston toward the head 3. When the piston reaches the head 3, that is, at the end of its travel in outward direction, the pipe 29 is placed in communication with the atmosphere, and the steam or other motive fluid is admitted to the cylinder through the pipe 31. At this time, the inner ends of the nipples 12 are in communication with the atmosphere, through the pipes 28, the T 27, the pipe 30 and the pipe 29, and the pressure on the inner surface of the said heads is but the atmospheric pressure. There is no pressure on the outer surface at this time, since neither pipe 24 nor the openings 20 of the hubs are open to the motive fluid, the said pipes being cut off from the said motive fluid by the piston, and they remain cut off until the piston passes the hubs on its inward stroke. As soon as the piston passes the said hubs, the sequence of operations above described, takes place. In the usual operation of the device, the piston does not at any time touch the hubs 18, the said hubs being operated entirely by the motive fluid. In case of accident, that would prevent the steam from operating the heads to withdraw the hubs, the piston would force the said hubs outwardly by its engagement with the beveled ends thereof.

I claim:

1. A device of the character specified, comprising in combination with the cylinder, the piston movable therein, and the rod connected with the piston extending out of the cylinder at one end, of a ring slidable on the rod and engaging the inner surface of the cylinder with its edge, said ring having a hub extending toward the piston and having transverse openings, a spring between the piston and the ring, and means for holding the ring at the longitudinal center of the cylinder when the piston moves toward the opposite end from the end through which the rod extends, said means comprising oppositely extending nipples, at the longitudinal center of the cylinder and communicating therewith, a head movable in each nipple and having a hub extending radially into the cylinder, the inner end of each hub being beveled in opposite directions, the nipples being reduced near their inner ends to form a shoulder for engagement by the head to limit the inward movement of the hubs, guides for the heads, and means for preventing rotation of the heads, means comprising pipes for admitting the motive fluid to the outer ends of the nipples and openings through the hubs, the outer faces of the heads being of greater area than the inner faces to cause the motive fluid to normally press the heads inwardly.

2. A device of the character specified, comprising in combination with the cylinder, the piston movable therein, and the rod connected with the piston extending out of the cylinder at one end, of a ring slidable on the rod and engaging the inner surface of the cylinder with its edge, said ring having a hub extending toward the piston and having transverse openings, a spring between the piston and the ring, and means for holding the ring at the longitudinal center of the cylinder when the piston moves toward the opposite end from the end through which the rod extends, said means comprising oppositely extending nipples at the longitudinal center of the cylinder and communicating therewith, a head, movable in each nipple and having a hub extending into the cylinder, the inner end of each hub being beveled in opposite directions, the nipples being reduced near their inner ends to form a shoulder for engagement by the head to limit the inward movement of the hubs, guides for the heads, means for preventing rotation of the heads, and means for admitting the motive fluid to both faces of each head.

3. A device of the character specified, comprising in combination with the cylinder, the piston movable therein, and the rod connected with the piston extending out of the cylinder at one end, of a ring slidable on the rod and engaging the inner surface of the cylinder with its edge, said ring having a hub extending toward the piston and having transverse openings, a spring between the piston and the ring, and means for holding the ring at the longitudinal center of the cylinder when the piston moves toward the opposite end from the end through which the rod extends, said means comprising oppositely extending nipples at the center of the cylinder, a head movable in each nipple, each head having a hub extending into the cylinder, said hub having its inner end beveled toward the opposite ends of the cylinder, means for limiting the inward movement of the heads, means for preventing rotation of the heads, and means for supplying an excess of motive fluid to the outer faces of the heads.

4. A device of the character specified, comprising in combination with the cylinder, the piston movable therein, and the rod connected with the piston extending out of the cylinder at one end, of a ring slidable on the rod and engaging the inner surface of the cylinder with its edge, said ring having a hub extending toward the piston and having transverse openings, a spring between the piston and the ring, and means for holding the ring at the longitudinal center of the cylinder when the piston moves toward the opposite end from the end through which the rod extends, said means comprising oppositely extending nipples at the center of the cylinder, a head movable in each nipple, each head having a hub extending into the cylinder, said hub having its inner end beveled toward the opposite ends of the cylinder, means for preventing rotation of the heads, and means for supplying an excess of motive fluid to the outer faces of the heads.

5. A device of the character specified comprising in combination with the cylinder, the piston movable therein and the rod connected with the piston extending out of the cylinder at one end, of a ring slidable on the rod and engaging the inner surface of the cylinder with its edge, said ring having a hub extending toward the piston and having transverse openings, a spring between the piston and the ring, and means for holding the ring at the longitudinal center of the cylinder when the piston moves toward the opposite end from the end through which the rod extends, said means comprising oppositely extending nipples at the center of the cylinder, a head movable in each nipple, each head having a hub extending into the cylinder, said hub having its inner end beveled toward the opposite ends of the cylinder, and means for supplying an excess of motive fluid to the outer faces of the heads.

6. In combination with the cylinder, the piston and the piston rod, of a supporting ring having transverse openings and encircling the rod and fitting the inner face of the cylinder, means for spacing the ring from the piston, and means for holding the ring at the longitudinal center of the cylinder when the piston moves inwardly, said means comprising oppositely extending nipples on the cylinder, a head in each nipple having a hub extending into the cylinder, means for supplying an excess of motive fluid to the outer faces of the heads, means for preventing rotation of the heads, means for guiding the heads, and means for limiting their inward movement.

7. In combination with the cylinder, the piston and the piston rod, of a supporting ring having transverse openings and encircling the rod and fitting the inner face of the cylinder, means for spacing the ring from the piston, and means for holding the ring at the longitudinal center of the cylinder when the piston moves inwardly, said means comprising oppositely extending nipples on the cylinder, a head in each nipple having a hub extending into the cylinder, means for supplying an excess of motive fluid to the outer faces of the heads, means for preventing rotation of the heads, and means for guiding the heads.

8. In combination with the cylinder, the piston and the piston rod, of a supporting ring having transverse openings and encircling the rod and fitting the inner face of the cylinder, means for spacing the ring from the piston, and means for holding the ring at the longitudinal center of the cylinder when the piston moves inwardly, said means comprising oppositely extending nipples on the cylinder, a head in each nipple having a hub extending into the cylinder, means for supplying an excess of motive fluid to the outer faces of the heads, and means for preventing rotation of the heads.

WM. VAN der LEAST.

Witnesses:
GILBERT DONSTAD,
JOSEPH SARGENT.